(12) United States Patent
Herbrich et al.

(10) Patent No.: US 8,374,973 B2
(45) Date of Patent: Feb. 12, 2013

(54) REPUTATION SYSTEM

(75) Inventors: Ralf Herbrich, Cambridge (GB); Thore Graepel, Cambridge (GB); David Shaw, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1348 days.

(21) Appl. No.: 11/693,653

(22) Filed: Mar. 29, 2007

(65) Prior Publication Data

US 2007/0192169 A1 Aug. 16, 2007

Related U.S. Application Data (63) Continuation-in-part of application No. 11/276,184, filed on Feb. 16, 2006, now Pat. No. 7,376,474.

(51) Int. Cl.
*G06Q 99/00* (2006.01)
*G06Q 30/00* (2006.01)
(52) U.S. Cl. ........................... 705/319; 705/347
(58) Field of Classification Search .................. 705/319, 705/347
See application file for complete search history.

(56) References Cited

U.S. PATENT DOCUMENTS

| | | | |
|---|---|---|---|
| 6,895,385 B1* | 5/2005 | Zacharia et al. | 705/10 |
| 7,406,436 B1* | 7/2008 | Reisman | 705/7.32 |
| 7,519,562 B1* | 4/2009 | Vander Mey et al. | 705/500 |
| 7,587,367 B2* | 9/2009 | Mengerink | 705/64 |
| 8,010,459 B2* | 8/2011 | Buyukkokten et al. | 705/319 |
| 2002/0046041 A1* | 4/2002 | Lang | 705/1 |
| 2005/0091077 A1* | 4/2005 | Reynolds | 705/1 |
| 2006/0042483 A1* | 3/2006 | Work et al. | 101/91 |
| 2007/0078675 A1* | 4/2007 | Kaplan | 705/1 |
| 2007/0124579 A1* | 5/2007 | Haller | 713/156 |

OTHER PUBLICATIONS

Bolton, Gary E; Katok, Elena; Ockenfels, Axel. How Effective Are Electronic Reputation Mechanisms? An Experimental Investigation. Management Science 50. 11 (Nov. 2004): 1587-1602.*

Song, Shanshan; Hwang, Kai; Zhou, Runfang; Kwok, Yu-Kwong. Trusted P2P Transactions with Fuzzy Reputation Aggregation. IEEE Internet Computing 9. 6 (Nov. 2005): 24-34.*

* cited by examiner

*Primary Examiner* — Jonathan Ouellette
*Assistant Examiner* — Amanda Kirlin
(74) *Attorney, Agent, or Firm* — Zete Law, P.L.L.C.; MacLane C. Kay (57) ABSTRACT

Reputation systems have been used to promote trust between participants in activities including online activities such as online market places. Existing online market places provide a reputation system which is a simple cumulative registry of user ratings on a given market place member. However, this simple system is open to abuse in situations where, for example, many positive ratings are given in a fraudulent manner. By modeling both reputation of participants and required reputation of participants an improved reputation system is provided. The required reputation may be thought of as a threshold, referred to herein as a required threshold, which may be used in determining how to update an indication of the reputation of a participant in the activity. The reputation system is able to learn information about required reputation and reputation of participants using an update process which is robust to participants who consistently give feedback of a particular type.

10 Claims, 6 Drawing Sheets

REPUTATION SYSTEM

CROSS-REFERENCE TO RELATED APPLICATION(S)

This patent application is a continuation-in-part of and claims the benefit of U.S. patent application Ser. No. 11/276,184, filed Feb. 16, 2006, titled "Bayesian Scoring" which is expressly incorporated herein by reference. That application is itself a continuation of and claims the benefit of U.S. patent application Ser. No. 11/041,752 entitled "Bayesian Scoring" filed on Jan. 24, 2005, now U.S. Pat. No. 7,050,868 which is also expressly incorporated herein by reference.

BACKGROUND

The invention relates to activities involving a plurality of participants where participants are required to follow specified standards of behavior such as a code of conduct. The participants may be humans or may be automated agents or automated services. A participant may also be two or more humans or agents working together. For example, the activity may be a game which may be provided online or in a conventional manner. In another example the activity may be a market or auction which may or may not be provided online. A common problem observed in such activities is that the standards of behavior are not met or are deliberately abused by some participants to the detriment of other participants in the activity. In some situations this may even lead to the breakdown of the activity as a whole. Some degree of trust is required between participants in order to ensure that the activity can succeed.

This problem is particularly exacerbated in the case of online activities or communities such as online chat rooms, electronic markets and virtual multiplayer game worlds. Conventional mechanisms for ensuring standards of behavior are met, such as legislation, written contracts, escrow services and the like cannot always be used for such online activities. For example, the transaction amounts in online market places are typically very low so that use of written contracts is prohibitively expensive.

History, reputation or rating systems have been used as a means of promoting trust between participants in activities and this is particularly the case for many online activities such as online market places. For example, existing online market places provide a reputation system which is a simple cumulative registry of user ratings and feedbacks on a given market place member. For example, each feedback is accompanied by either a positive, neutral or negative rating and these ratings may be combined in a simple manner. However, this simple system is open to abuse in situations where for example, many positive ratings are given in a fraudulent manner.

For example, consider an online gaming service whereby participants are able to play online games with one another. It is known to enable players of online games to leave positive or negative feedback on other players whom they have participated with in an online game. However, it is difficult to make use of this feedback information because it is often inaccurate. For example, some players always leave negative feedback irrespective of their actual experience in a particular game. Other players always leave positive feedback even when this is not warranted. Similar problems arise in other situations, for example, in online market places where participants leave feedback about the behavior of vendors and/or purchasers.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Reputation systems have been used to promoting trust between participants in activities including online activities such as online market places. Existing online market places provide a reputation system which is a simple cumulative registry of user ratings on a given market place member. However, this simple system is open to abuse in situations where for example, many positive ratings are given in a fraudulent manner. By modeling both reputation of participants and required reputation of participants an improved reputation system is provided. The required reputation may be thought of as a threshold, referred to herein as a required threshold, which may be used in determining how to update an indication of the reputation of a participant in the activity. The reputation system is able to learn information about required reputation and reputation of participants using an update process which is robust to participants who consistently give feedback of a particular type.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

An Exemplary System

Figure 1:
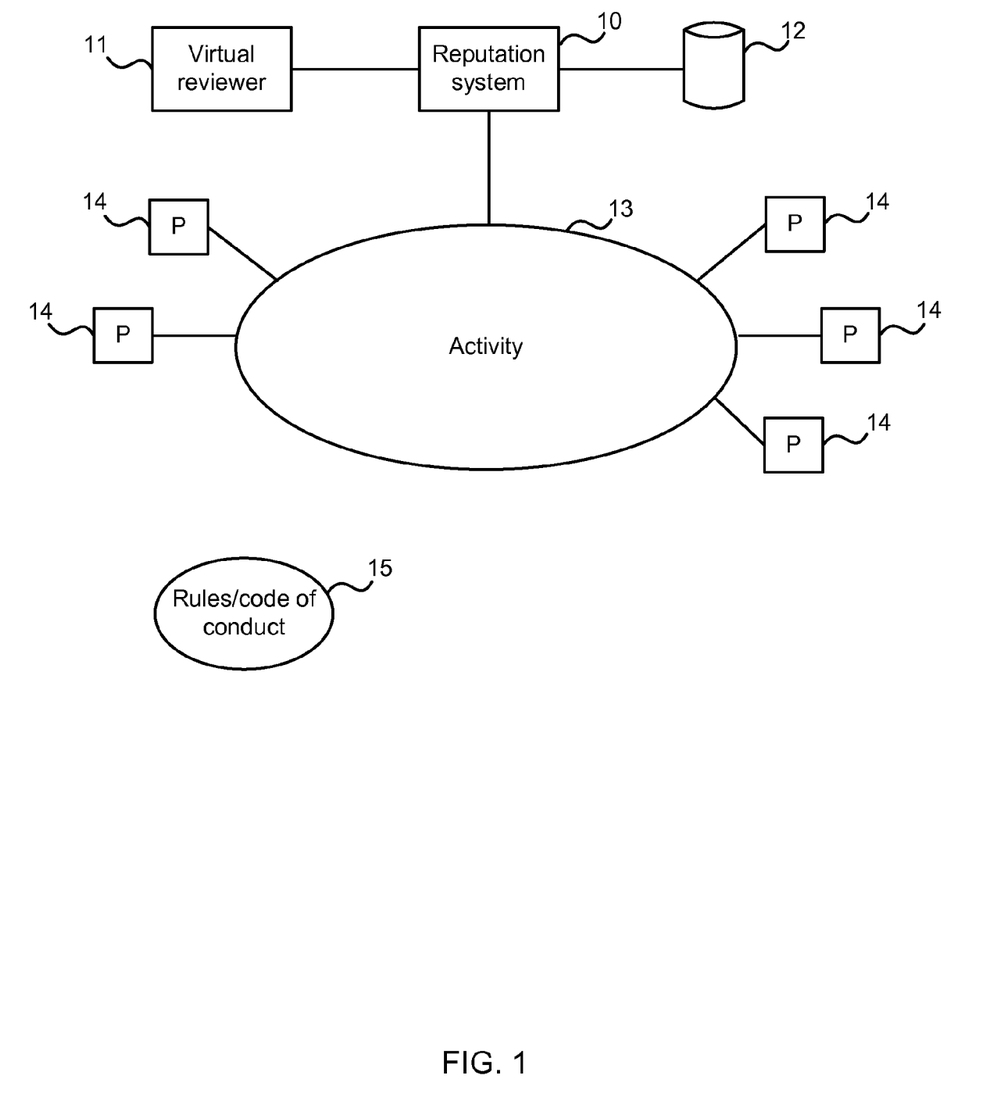
FIG. 1 is a schematic diagram of a reputation system associated with an activity.

FIG. 1 is a schematic diagram of a reputation system 10 associated with an activity 13. The activity 13 may be an online market place, a physical market place, a physical game, an online game, or any other activity in which a plurality of participants 14 may engage and where a set of rules or a code of conduct 15 or the like exists associated with the activity. For example, in the case of an online market place a code of conduct might comprise a rule specifying that if payment has been received for a particular good as advertised, that good should be shipped to the payer promptly, the good being of the same quality as advertised. The rules or code of conduct 15 are shown schematically in FIG. 1 and these may be embodied at each participant 14, may be published by the reputation system 10 or may be accessible to the participants in any other suitable manner.

The reputation system has access to information about the activity. This information is received by the reputation system in any suitable manner. For example, if the activity comprises an online market place, a network node providing the online market place service may be arranged to send information to the reputation system 10 via a communications link of any suitable type. Alternatively, participants 14 may send or input information directly to the reputation system 10 either manually or via a communications link.

The reputation system 10 has access to a database 12 which may be integral with the reputation system or may be provided at any suitable location to which the reputation system has access. This database may be used to store information about the participants 14 and/or any other information received about the activity 13 as described in more detail below.

A virtual reviewer 11 is also provided which may be integral with the reputation system 10 or may be provided at another location in communication with the reputation system. The virtual reviewer is described in more detail later.

Exemplary Method

Figure 2:
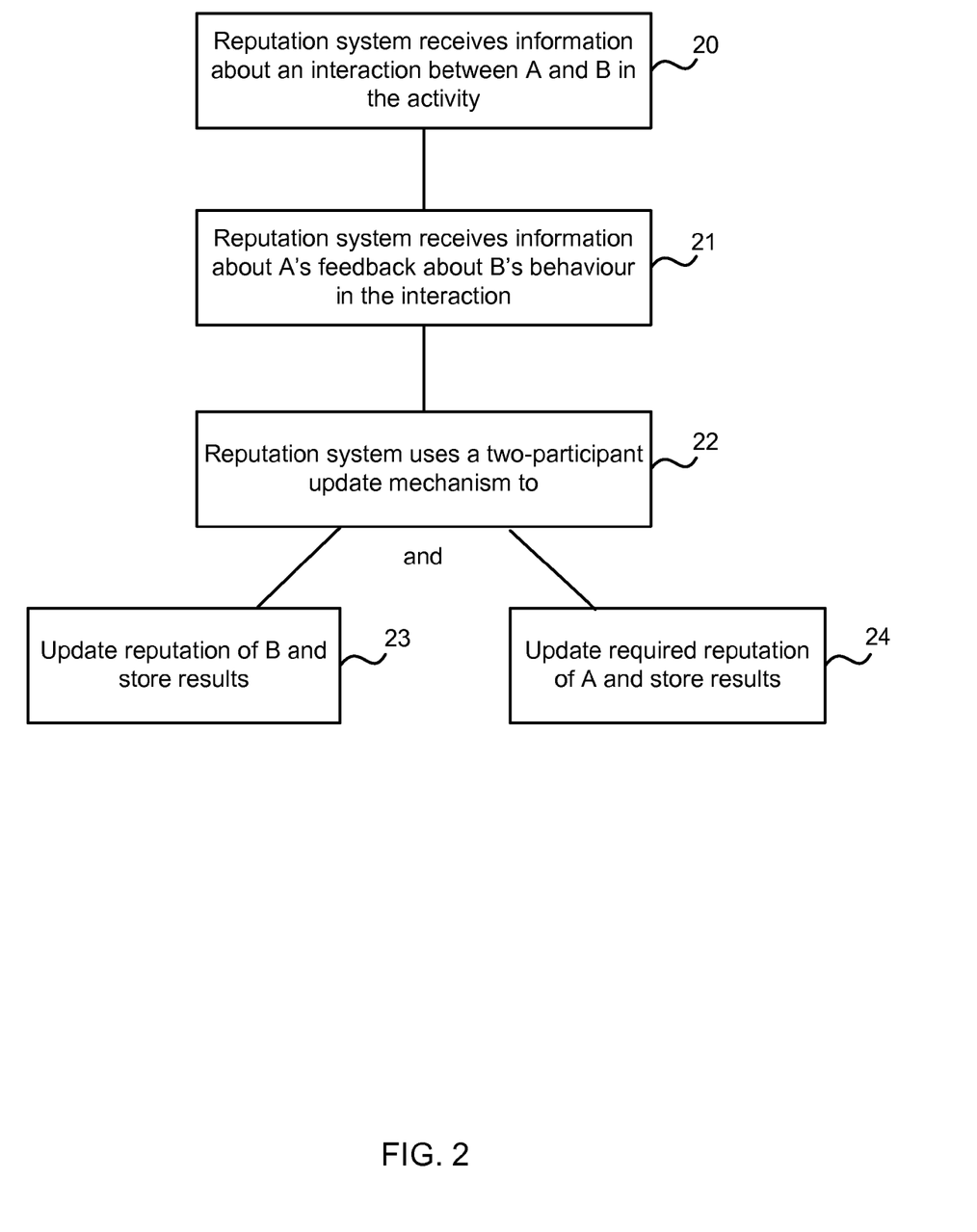
FIG. 2 is an example method of operating a reputation system.

Suppose participants A and B interact in the activity 13. For example, A and B might play an online game together or may encounter one another in an online market place transaction. The reputation system 10 receives (block 20) information about this interaction between A and B. For example, this information may be sent directly from A and B to the reputation system 10 or may be received from a web service or network node providing the online game service or online market place. The information may comprise information about the identity of A and B together with feedback A makes about B's behavior during the interaction (block 21). The reputation system then uses an update mechanism to update information about B's reputation (block 23). For example, this may be B's reputation as a player of the game or B's reputation as an online vendor. The reputation system also uses the update mechanism to update information about a required reputation of A (block 24). Any suitable update mechanism may be used and some examples are described in more detail below.

The term "required reputation" is used herein to refer to information about the behavior of a participant as a reviewer of one or more other participants' behavior. This required reputation may be thought of as a threshold, referred to herein as a required reputation threshold, and which may be used in determining how to update an indication of the reputation of a participant in the activity.

Once the updating process has been completed the updated reputation and required reputation information is stored at database 12. Using the updating process the reputation system is able to learn more about participants' reputations and about participant's required reputations.

The reputation system models, for each participant, that participant's reputation as a partaker of the activity and also a reference value of that participant's reputation as a reviewer of other participants' behavior. That is, the "required reputation" is not a reputation of the reviewer but a reference value on a reputation scale that the reviewer uses to judge other participants. Over time, as the reputation system observes interactions between participants it is able to learn information about those participants' reputations and required reputations using the update mechanism. Thus for each participant, at least two values are stored at database 12, one value relating to reputation and one value relating to required reputation. Any suitable method for achieving the modeling may be used. For example, Bayesian probability based methods may be used as described in more detail below. By modeling both reputation and required reputation and arranging a learning or update mechanism which comprises a relationship between these factors, it is possible to provide a reputation system which is relatively robust to feedback which is fraudulent or unjustified. The reputation system models not only the reputation of participants as partakers of the activity but also models the preference structure of those participants as reviewers.

Another Exemplary Method

Figure 3:
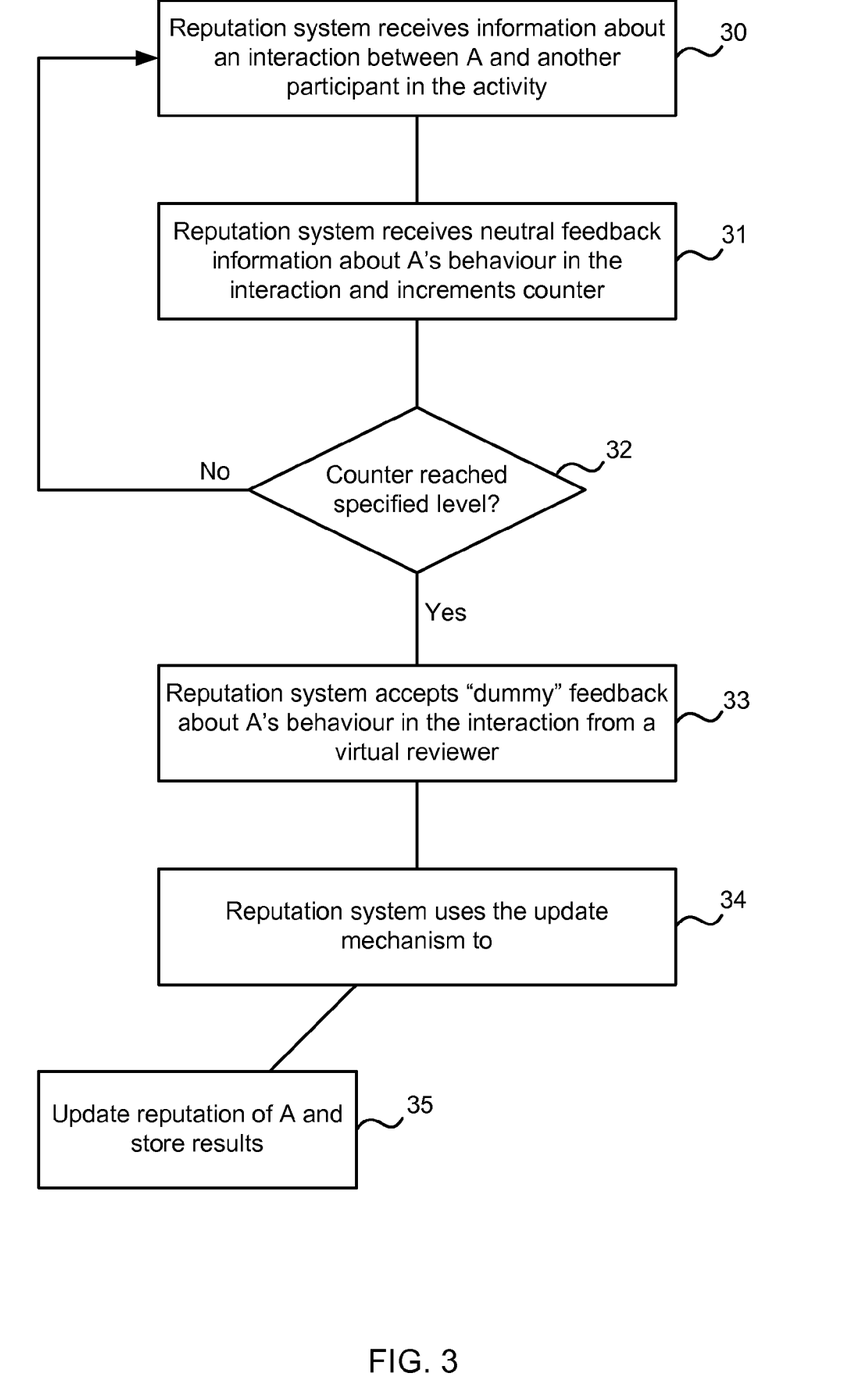
FIG. 3 is another example method of operating a reputation system.

FIG. 3 shows another example of a method at the reputation system. The reputation system receives information about an interaction between A and another participant in the activity (block 30). Neutral feedback is received about A's behavior in the interaction (block 31) and optionally a counter is incremented (block 32). If the counter has reached a specified level then a so called healing process is carried out as now described. Otherwise the reputation system waits until it receives more neutral feedback about A.

The healing process involves accepting dummy feedback about A's behavior in the interaction from a virtual reviewer. This dummy feedback is then used to carry out an update using the update mechanism (block 34), update the reputation of A (block 35) and store the results.

For example, suppose a participant has received a low reputation as a result of taking part in the activity over a period of time. If this participant takes place in interactions where neutral feedback is given, the healing process may be arranged to enable that participant's reputation to be increased even though neutral feedback was received. This is done by arranging the dummy feedback to be positive (for example) so that when the update process is carried out the reputation increases. Thus in situations where neutral feedback is given the dummy feedback mechanism may be used to enable changes to reputation levels to be made.

As mentioned above, the counter mechanism (block 32) is optional and may be used for example, to arrange that the healing process only occurs once neutral feedback has been received a plurality of times.

The update used during the healing process at block 35 may optionally be a partial update as described in more detail below. By using a partial update it is possible to arrange the healing process to occur at a finer scale than otherwise.

Model

As mentioned above the methods described herein comprise modeling reputation of participants of an activity. Also, a required reputation is modeled, relating to a reference value of a participant as a reviewer of other participants' behavior in the activity. Any suitable model may be used. For example, a probability distribution is used to model a belief about reputation of a particular participant in the activity. Also, a probability distribution may be used to model a belief about required reputation of a participant. A bell-curve belief distribution such as a Gaussian distribution or an approximation to a Gaussian distribution may be used, or any other suitable probability distribution. For example, a bimodal or skewed distribution.

Statistics relating to or describing the probability distribution may be used in the models mentioned above. For example, in the case that a Gaussian distribution is used, its mean and standard deviation may be selected. However, this is not essential, any suitable statistics relating to or describing a probability distribution used in the model may be used.

In the case that a Gaussian distribution is used for example to model belief about reputation, the area under the reputation belief distribution curve within a certain range corresponds to the belief that a participant's reputation will lie in that range. As the reputation system learns more about a participant's reputation, the standard deviation of the distribution tends to become smaller, more tightly bracketing that participant's reputation. In the same way a Gaussian distribution may be used to model belief about required reputation of a participant.

As mentioned above, for each participant, at least two values are stored at database 12, one value relating to reputation and one value relating to required reputation. In the case that a probability distribution is used in the modeling together with associated statistics, such as the mean and standard deviation of that distribution, then for each participant, one value for each statistic is stored at the database 12. For example, four values may be stored for each participant as follows:

mean of reputation belief;
standard deviation of reputation belief;
mean of required reputation belief;
standard deviation of required reputation belief.

For participants that are new to the reputation system the belief statistics may be set to default values. If the participant is known to the reputation system, the belief statistics may be those previously determined using the update mechanism described above.

Update Mechanism

As mentioned above any suitable update mechanism may be used. For example, an update mechanism using weighting techniques based on Bayes' law. Alternatively, techniques based on constraint satisfaction could be used, i.e., the constraint arising from "A gives negative feedback about B" is that A's required reputation is greater than B's reputation. The update mechanism would then aim at solving the constraint satisfaction problem arising from the stream of feedbacks. Another alternative is to define a cost or energy function that penalizes violation of constraints and minimize that cost function, e.g., by gradient descent.

The update mechanism is arranged to comprise a relationship or dependency between reputation and required reputation. For example, this relationship may be arranged to reduce the effect of participants who make unjustified or inappropriate reviews of other participants or to promote the effect of participants who make justified reviews of other participants.

Example of Update Rule Used by Update Mechanism

In an example, participants are able to give either positive (prefer), negative (avoid) or neutral feedback about other participants with whom they have interacted in the activity. In the case that participant A gives positive (prefer) feedback about participant B then the reputation system uses the following rule:

Prefer

Reputation of participant B exceeds reporting threshold of reviewing participant A. This may also be considered as B's reputation winning against A's reporting threshold.

In the case that participant A gives negative (avoid) feedback about participant B then the reputation system uses the following rule:

Avoid

Reputation of participant B is less than reporting threshold of reviewing participant A. This may also be considered as B's reputation losing against A's reporting threshold In the case that neutral feedback is given the reputation system may be arranged to consider this a draw and/or to follow the procedure described above with reference to FIG. 3.

In the case of a two-participant interaction where A gives feedback about B the reputation system determines the winner (B's reputation or A's reporting threshold) and the loser (B's reputation or A's reporting threshold). It then applies the following update equations, in the case that the modeling uses Gaussian distributions described by two statistics, mean $\mu$ and standard deviation $\sigma$. By repeating such updates for a number of feedbacks the means and standard deviations for the belief distributions for B's reputation and A's reporting threshold are learnt. In cases where B gives feedback about A, information about A's reputation and B's reporting threshold are learnt.

$$\mu_{winner} \leftarrow \mu_{winner} + \sigma^2_{winner}/c * v((\mu_{winner} - \mu_{loser})/c, \epsilon/c)$$

$$\mu_{loser} \leftarrow \mu_{loser} - \sigma^2_{loser}/c * v((\mu_{winner} - \mu_{loser})/c, \epsilon/c)$$

$$\sigma^2_{winner} \leftarrow \sigma^2_{winner} * [1 - \sigma^2_{winner}/c^2 * w((\mu_{winner} - \mu_{loser})/c, \epsilon/c)]$$

$$\sigma^2_{loser} \leftarrow \sigma^2_{loser} * [1 - \sigma^2_{loser}/c^2 * w((\mu_{winner} - \mu_{loser})/c, \epsilon/c)]$$

$$c^2 = 2\beta^2 + \sigma^2_{winner} + \sigma^2_{loser}$$

In these equations, the only unknown is $\beta^2$ which is the variance of the feedback around the reputation or required reputation of each participant. $\beta^2$ is thus a configurable parameter and for example is set between 0.1 and 1.0. The parameter $\epsilon$ is a draw margin which may be set at 0.0 if only positive or negative feedback is allowed. Otherwise, it is chosen so as to reflect the relative proportion of expected neutral feedback with respect to all the feedback given. The functions $v(.,.)$ and $w(.,.)$ are given by $$v(t, \alpha) = \frac{N(t - \alpha)}{\Phi(t - \alpha)}$$

$$w(t, \alpha) = v(t, \alpha) \cdot (v(t, \alpha) - (t - \alpha))$$

if the interaction ends in win or loss and $$v(t, \alpha) = \frac{N(-\alpha - t) - N(\alpha - t)}{\Phi(\alpha - t) - \Phi(-\alpha - t)}$$

$$w(t, \alpha) = v^2(t, \alpha) + \frac{(\alpha - t)N(\alpha - t) - (-\alpha - t)N(-\alpha - t)}{\Phi(\alpha - t) - \Phi(-\alpha - t)}$$

if the interaction ends in a draw. Where the symbols N and $\Phi$ represent the density of the Gaussian distribution function and the cumulative distribution function of the Gaussian, respectively. The symbols t and $\alpha$ are simply arguments to the functions. Any suitable numerical or analytic methods can be used to evaluate these functions such as those described in Press et al., Numerical Recipes in C: the Art of Scientific Computing (2d. ed.), Cambridge, Cambridge University Press, ISBN-0-521-43108-5.

For examples, participants who consistently leave negative feedback drive their reporting thresholds to high values. As a consequence, their negative feedback hardly affect the reputation of most participants in the future, because, in terms of the update mechanism described above, their negative feedback is an expected outcome.

Participants who consistently leave positive feedback drive their reporting thresholds to low values in some examples. As a consequence, their future positive feedbacks hardly affect the reputation of most participants, again because their positive feedback is an expected outcome.

It is also possible in some examples for the reputation system to be used to promote improved participant behavior as reviewers and/or as participants in the activity. For example, the reputation system may display or otherwise make a participant's belief statistics from the database 12 available to that participant and/or other participants.

For example, the reputation system may be arranged to model the change in a participant's behavior as a reviewer and/or as a participant in the activity. Before starting to determine the new reputation and required reputation beliefs for each participant in an interaction, the reputation system may assume that the reputation and required reputation have changed slightly between the current and the last interaction involving those participants. In order to achieve this the standard deviation of the belief distributions is slightly increased. For example, this is achieved using the configurable parameter $B^2$ mentioned above also referred to as a dynamics factor. This enables the reputation system to track changes in reputation and required reputation over time and ensures the uncertainty $\sigma$ never decreases to zero. The dynamics factor may be used to increase the variances of the estimated quantities after each update step, hence allowing the posterior (of the Bayesian update mechanism) to drift.

The reputation system may also be used to predict ahead of time what feedback will be given for a potential interaction between participants. This may be used for example to suggest possible interactions where a particularly effective reviewer is involved. This can also be thought of as matching participants for potential interactions. More detail about predicting feedback is given later in this document.

Partial Update

Figure 4:
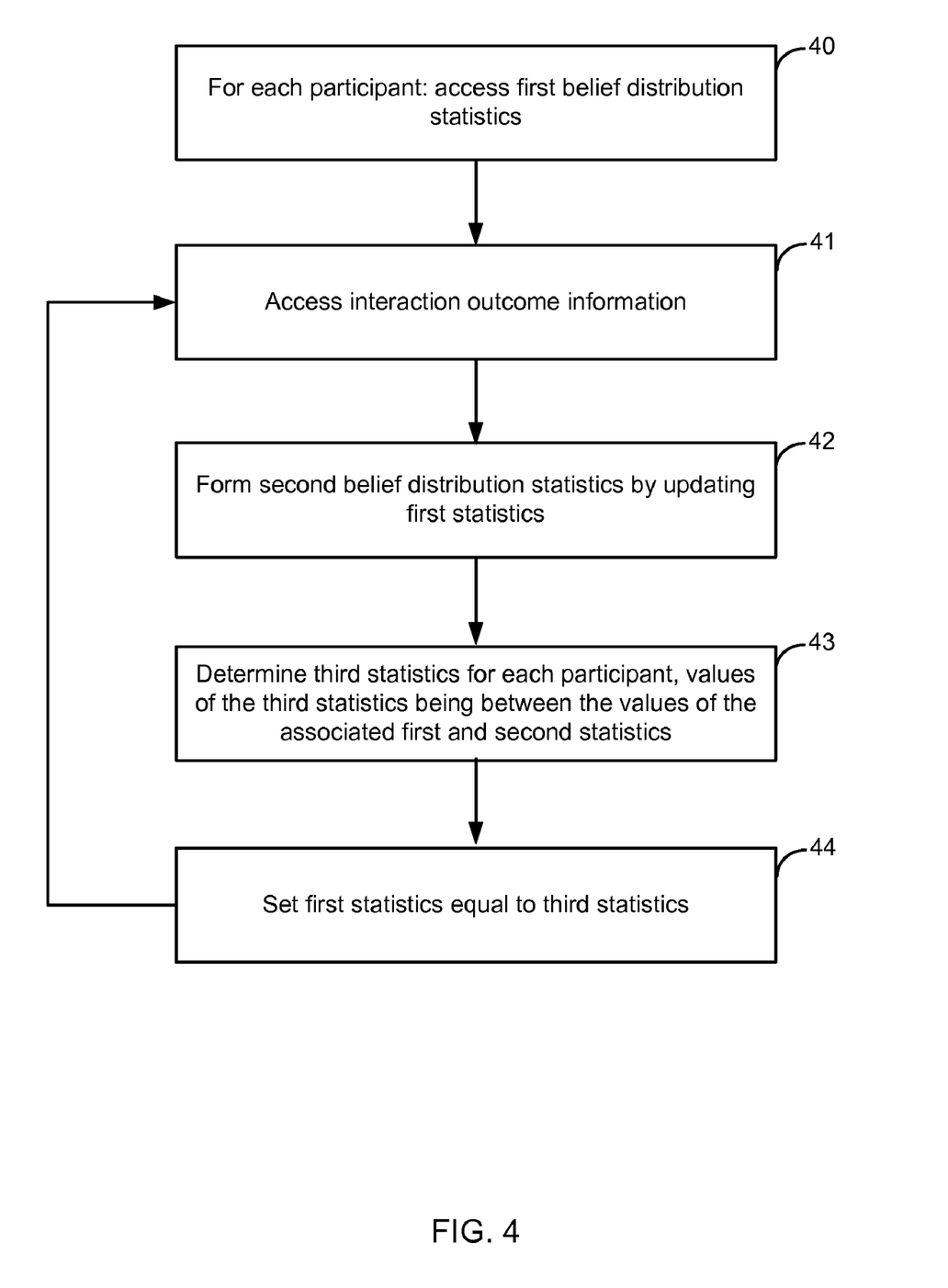
FIG. 4 is an example method of carrying out a partial update.

As described above with reference to FIG. 3 a partial update may be used by the reputation system in the case that neutral feedback is given. For example, FIG. 4 is a high level flow diagram of a method of carrying out a partial update using the reputation system.

For each participant in an interaction first belief distribution statistics are accessed (block 40), for example from the database 12. Suppose that the interaction is between A and B and that A gives feedback about B's behavior in the interaction. In this case the reputation system may access belief distribution statistics about A's reporting threshold and about B's reputation. Information about the outcome of the interaction is then accessed or received by the reputation system (block 41) as described above with reference to FIG. 2. Second belief distribution statistics are then formed by the reputation system (block 42) by updating the first statistics. Any suitable update mechanism may be used, for example, as described above. In order to make a partial update the reputation system proceeds to determine third statistics for the participants A and B (block 43). These third statistics are between the values of the associated first and second statistics. The first statistics are then set equal to the third statistics (block 44) to record the partial update and the results may be stored in database 12.

In an example, the reputation system achieves the partial update by making an interpolation between the first and second statistics for a given participant. Any suitable type of linear or non-linear interpolation may be used.

In some examples the interpolation is carried out in a natural or canonical representation of the belief probability space. For example, in the case that linear interpolation is used this may be carried out in the natural parameters of a distribution in the exponential family.

In one example, the belief distributions are represented using Gaussian distributions and the belief statistics for a given participant comprise a mean $\mu$ and a standard deviation $\sigma$. In this case a linear interpolation may be carried out on the statistics $\mu/\sigma^2$ and $1/\sigma^2$. In this case the natural or canonical representation of the belief probability space is the ($\mu/\sigma^2$, $1/\sigma^2$) space.

In a particular example, a linear interpolation scheme is used for the partial update on the $\mu/\sigma^2$ and $1/\sigma^2$ parameters. This is achieved using the following update equations where $\mu_{old}$ and $\sigma_{old}$ are the parameters of a participant before the update (first statistics of FIG. 4); $\mu_{new}$ and $\sigma_{new}$ are the parameters of the participant after a regular update by the processor (second statistics of FIG. 4); and $\underline{\mu}$ and $\underline{\sigma}$ are the reputation parameters of the partial update (third statistics of FIG. 4). The update level, or strength of the partial update is given by $\alpha$. In this example, $\alpha=1$ corresponds to a full, regular update and $\alpha=0$ corresponds to no update of the player reputation as a result of the feedback.

$$\underline{\mu} = \frac{\alpha\mu_{new}\sigma_{old}^2 + (1-\alpha)\mu_{old}\sigma_{new}^2}{\alpha\sigma_{old}^2 + (1-\alpha)\sigma_{new}^2}$$

$$\underline{\sigma}^2 = \frac{\sigma_{old}^2 \sigma_{new}^2}{\alpha\sigma_{old}^2 + (1-\alpha)\sigma_{new}^2}$$

In this way, reducing the update $\alpha$ by a factor v in the ($\mu/\sigma^2$, $1/\sigma^2$) space directly corresponds to disregarding a fraction (1−v) of the interaction outcome information.

However, it is not essential to work in the ($\mu/\sigma^2$, $1/\sigma^2$) space. For example, it is possible to use the following update equations or any other suitable update equations:

$$\underline{\mu} = \alpha\mu_{old} + (1-\alpha)\mu_{new}$$

$$\underline{\sigma}^2 = \alpha\sigma_{old}^2 + (1-\alpha)\sigma_{new}^2$$

More detail about example modeling methods and example update mechanisms are now given.

Any examples below which refer to teams of participants in an interaction are to be considered as if each team has only one member and only two teams may be involved in a single interaction.

In a two participant interaction in which participant A gives feedback about B, the outcomes may be A prefers, A avoids, or A gives neutral feedback. The outcome of the interaction may be indicated in any suitable manner such as through ranking of the participants' reputations and required reputations for that particular interaction. For example, the rank $r_i$ of a participant may have a value of 1 for the winning reputation or required reputation and a value of 2 for a losing reputation. In a tie such as when neutral feedback is given, the two participants will have the same rank.

A participant's score $s_i$ may indicate the participant's standing relative to a standard scale and/or other participants.

The score may be individual to one or more people acting as a participant, or to an activity type, an interaction application, and the like. The score $s_i$ of each participant may have a stochastic order property. More particularly, if participant i is scored above participant j, then participant i is more likely to give proper feedback against participant j as opposed to participant j winning against participant i. In mathematical terms:

$$s_i \geq s_j \rightarrow P(\text{participant } i \text{ wins}) \geq P(\text{participant } j \text{ wins}) \quad (1)$$

Each participant has two scores, one as a reviewer and one as a reviewee. To estimate these scores for each participant, a Bayesian learning methodology may be used. With a Bayesian approach, the belief in a true score $s_i$ of a participant may be indicated as a probability density of the score (i.e., P(s)). In the following examples, the probability density of the score representing the belief in the true score is selected as a Gaussian with a mean μ and a diagonal covariance matrix (diag ($\sigma^2$)). The Gaussian density may be shown as:

$$P(s) = N(s; \mu, \text{diag}(\sigma^2)) \quad (2)$$

Selecting the Gaussian allows the distribution to be unimodal with mode μ. In this manner, a participant should not be expected to alternate between widely varying levels of behavior. Additionally, a Gaussian representation of the score may be stored efficiently in memory. In particular, assuming a diagonal covariance matrix effectively leads to allowing each of the two individual scores for a participant i to be represented with two values: the mean $\mu_i$ and the variance $\sigma_i^2$.

The initial and updated scores (e.g., mean μ and variance $\sigma^2$) of each participant may be stored in any suitable manner. For example, the mean and variance of each participant may be stored in separate vectors, e.g., a mean vector μ and variance vector $\sigma^2$, a data store, and the like. If all the means and variances for all possible participants are stored in vectors, e.g., μ and $\sigma^2$, then the update equations may update only those means and variances associated with the participants that participated in the interaction outcome. Alternatively or additionally, the score for each participant may be stored in a participant profile data store, a score matrix, and the like.

The Gaussian model of the distribution may allow efficient update equations for the mean $\mu_i$ and the variance $\sigma_i^2$ as the reputation system is learning the scores for each participant. After observing the outcome of an interaction, e.g., indicated by the rank r of the participants for that interaction, the belief distribution or density P(s) in the scores s (e.g., score $s_i$ for participant i and score $s_j$ for participant j) may be updated using Bayes rule given by:

$$P(s \mid r, \{i_1, \ldots, i_k\}) = \frac{P(r \mid s, \{i_1, \ldots, i_k\}) P(s \mid \{i_1, \ldots, i_k\})}{P(r \mid \{i_1, \ldots, i_k\})} \quad (3)$$
$$= \frac{P(r \mid s_{i_1}, \ldots, s_{i_k}) P(s)}{P(r \mid \{i_1, \ldots, i_k\})}$$

where the variable $i_k$ is an identifier or indicator for each participant of a team k participating in the interaction. As mentioned above, in the application of Bayesian scoring to a reputation system each participant has two scores, one as a reviewer and one as a reviewee. The outcome of an interaction between two participants then depends on the required reputation of the reviewer and the reputation of the reviewee. In the two participant example, the vector $i_1$ for the first team is an indicator for participant A and the vector $i_2$ for the second team is an indicator for participant B. In the multiple participant example discussed further below, the vector i may be more than one for each team. In the multiple team example discussed further below, the number of teams k may be greater than two. In a multiple team example of equation (3), the probability of the ranking given the scores of the participants $P(r \mid s_{i_1}, \ldots, s_{i_k})$ may be modified given the scores of the team $S(s_{ik})$ which is a function of the scores of the individual participants of the team.

The new updated belief, $P(s \mid r, \{i_1, \ldots i_k\})$ is also called the posterior belief (e.g., the updated scores) and may be used in place of the prior belief P(s), e.g., the participant scores in the evaluation of the next interaction for those opponents. Such a methodology is known as on-line learning, e.g., over time only one belief distribution P(s) is maintained and each observed interaction outcome r for the participants participating $\{i_1, \ldots, i_k\}$ is incorporated into the belief distribution.

After incorporation into the determination of the participants' scores, the outcome of the interaction may be disregarded. However, the interaction outcome r may not be fully encapsulated into the determination of each participant's score. More particularly, the posterior belief $P((s \mid r, \{i_1, \ldots i_k\})$ may not be represented in a compact and efficient manner, and may not be computed exactly. In this case, a best approximation of the true posterior may be determined using any suitable approximation technique including expectation propagation, variational inference, assumed density filtering, Laplace approximation, maximum likelihood, and the like. Assumed density filtering (ADF) computes the best approximation to the true posterior in some family that enjoys a compact representation—such as a Gaussian distribution with a diagonal covariance. This best approximation may be used as the new prior distribution. The examples below are discussed with reference to assumed density filtering solved either through numerical integration and/or expectation propagation.

Gaussian Distribution

The belief in the score of each participant may be based on a Gaussian distribution. A Gaussian density having n dimensions is defined by:

$$N(x; \mu, \Sigma) = (2\pi)^{-\frac{n}{2}} |\Sigma|^{-\frac{1}{2}} \exp\left(-\frac{1}{2}(x-\mu)^T \Sigma^{-1}(x-\mu)\right) \quad (4)$$

The Gaussian of N(x) may be defined as a shorthand notation for a Gaussian defined by N(x;0,1). The cumulative Gaussian distribution function may be indicated by $\Phi(t; \mu, \sigma^2)$ which is defined by:

$$\Phi(t; \mu, \sigma^2) = P_{x \simeq N(x;\mu,\sigma^2)}(x \leq t) = \int_{-\infty}^{t} N(x; \mu, \sigma^2) dx \quad (5)$$

Again, the shorthand of $\Phi(t)$ indicates a cumulative distribution of $\Phi(t; 0, 1)$. The notation of $<f(x)>_{x \sim P}$ denotes the expectation of f over the random draw of x, that is $<f(x)>_{x \sim P} = \int f(x) \, dP(x)$. The posterior probability of the outcome given the scores or the probability of the scores given the outcome may not be a Gaussian. Thus, the posterior may be estimated by finding the best Gaussian such that the Kullback-Leibler divergence between the true posterior and the Gaussian approximation is minimized. For example, the posterior $P(\theta \mid x)$ may be approximated by $N(\theta, \mu_x^*, \Sigma_x^*)$ where the superscript * indicates that the approximation is optimal for the given x. In this manner, the mean and variance of the approximated Gaussian posterior may be given by:

$$\mu_x^* = \mu + \Sigma g_x \quad (6)$$

$$\Sigma_x^* = \Sigma - \Sigma(g_x g_x^T - 2G_x)\Sigma \quad (7)$$

Where the vector $g_x$ and the matrix $G_x$ are given by:

$$g_x = \left.\frac{\partial \log(Z_x(\tilde{\mu}, \tilde{\Sigma}))}{\partial \tilde{\mu}}\right|_{\tilde{\mu}=\mu, \tilde{\Sigma}=\Sigma} \quad (8)$$

$$G_x = \left.\frac{\partial \log(Z_x(\tilde{\mu}, \tilde{\Sigma}))}{\partial \tilde{\Sigma}}\right|_{\tilde{\mu}=\mu, \tilde{\Sigma}=\Sigma} \quad (9)$$

and the function $Z_x$ is defined by:

$$Z_x(\mu, \Sigma) = \int t_x(\theta) N(\theta; \mu; \Sigma) d\theta = P(x) \quad (10)$$

Rectified Truncated Gaussians

A variable x may be distributed according to a rectified double truncated Gaussian (referred to as rectified Gaussian from here on) and annotated by $x \sim R(x; \mu, \sigma^2, \alpha, \beta)$ if the density of x is given by:

$$R(x; \mu, \sigma^2, \alpha, \beta) = I_{x \in (\alpha, \beta)} \frac{N(x; \mu, \sigma^2)}{\Phi(\beta; \mu, \sigma^2) - \Phi(\alpha; \mu, \sigma^2)} \quad (11)$$

$$= I_{x \in (\alpha, \beta)} \frac{N\left(\frac{x-\mu}{\sigma}\right)}{\sigma\left(\Phi\left(\frac{\beta-\mu}{\sigma}\right) - \Phi\left(\frac{\alpha-\mu}{\sigma}\right)\right)} \quad (12)$$

When taking the limit of the variable β as it approaches infinity, the rectified Gaussian may be denoted as $R(x; \mu, \sigma^2, \alpha)$.

The class of the rectified Gaussian contains the Gaussian family as a limiting case. More particularly, if the limit of the rectified Gaussian is taken as the variable α approaches infinity, then the rectified Gaussian is the Normal Gaussian indicated by $N(x; \mu, \sigma^2)$ used as the prior distribution of the scores.

The mean of the rectified Gaussian is given by:

$$\langle x \rangle_{x \sim R} = \mu + \sigma v\left(\frac{\mu}{\sigma}, \frac{\alpha}{\sigma}, \frac{\beta}{\sigma}\right) \quad (13)$$

where the function $v(\cdot, \alpha, \beta)$ is given by:

$$v(t, \alpha, \beta) = \frac{N(\alpha - t) - N(\beta - t)}{\Phi(\beta - t) - \Phi(\alpha - t)} \quad (14)$$

The variance of the rectified Gaussian is given by:

$$\langle x^2 \rangle_{x \sim R} - (\langle x \rangle_{x \sim R})^2 = \sigma^2\left(1 - w\left(\frac{\mu}{\sigma}, \frac{\alpha}{\sigma}, \frac{\beta}{\sigma}\right)\right) \quad (15)$$

where the function $w(\cdot, \alpha, \beta)$ is given by:

$$w(t, \alpha, \beta) = v^2(t, \alpha, \beta) + \frac{(\beta-t)N(\beta-t) - (\alpha-t)N(\alpha-t)}{\Phi(\beta-t) - \Phi(\alpha-t)} \quad (16)$$

As β approaches infinity, the functions $v(\cdot, \alpha, \beta)$ and $w(\cdot, \alpha, \beta)$ may be indicated as $v(\cdot, \alpha)$ and $w(\cdot, \alpha)$ and determined using:

$$v(t, \alpha) = \lim_{\beta \to \infty} v(t, \alpha, \beta) = \frac{N(t-\alpha)}{\Phi(t-\alpha)} \quad (17)$$

$$w(t, \alpha) = \lim_{\beta \to \infty} w(t, \alpha, \beta) = v(t, \alpha) \cdot (v(t, \alpha) - (t - \alpha)) \quad (18)$$

These functions may be determined using numerical integration techniques, or any other suitable technique. The function $w(\cdot, \alpha)$ may be a smooth approximation to the indicator function $I_{t \leq \alpha}$ and may be always bounded by [0,1]. In contrast, the function $v(\cdot, \alpha)$ may grow roughly like α−t for t<α and may quickly approach zero for t>α.

The auxiliary functions $\tilde{v}(t, \epsilon)$ and $\tilde{w}(t, \epsilon)$ may be determined using:

$$\tilde{v}(t, \epsilon) = v(t, -\epsilon, \epsilon) \quad (19)$$

$$\tilde{w}(t, \epsilon) = w(t, -\epsilon, \epsilon) \quad (20)$$

Learning Scores Over Time

A Bayesian learning process for a scoring system learns the scores for each participant based upon the outcome of each interaction involving those participants. Bayesian learning may assume that each participant's unknown, true score is static over time, e.g., that the true participant scores do not change. Thus, as more interactions are played by a participant, the updated participant's score may reflect a growing certainty in this true score. In this manner, each new interaction played may have less impact or effect on the certainty in the updated participant score.

However, a participant may improve (or unfortunately worsen) their behavior as reflected in the feedback over time relative to other participants and/or a standard scale. In this manner, each participant's true score is not truly static over time. Thus, the learning process of the scoring system may learn not only the true score for each participant, but may allow for each participant's true score to change over time due to changed abilities of the participant. To account for changed participant abilities over time, the posterior belief of the scores $P(s|r, \{i_1, \ldots i_k\})$ may be modified over time. For example, participants may react to negative feedback received by improving their behavior for a period of time (e.g., Δt). Thus, the posterior belief of the score of a participant may be modified based upon the playing history of that participant. More particularly, the posterior belief used as the new prior distribution may be represented as the posterior belief $P(s_i|\Delta t)$ of the score of the participant with index i, given that he had not played for a time of Δt. Thus, the modified posterior distribution may be represented as:

$$P(s_i|\Delta t) = \int P(s_i|\mu) P(\mu|\Delta t) d\mu \quad (21)$$

$$= \int N(s_i; \mu_i, \sigma_i^2) N(\mu; \mu_i, \tau^2(\Delta t)) d\mu$$

$$= N(s_i; \mu_i, \sigma_i^2 + \tau^2(\Delta t))$$

where the first term $P(s_i|\mu)$ is the belief distribution of the score of the participant with the index i, and the second term $P(\mu|\Delta t)$ quantifies the belief in the change of the unknown true score at a time of length $\Delta t$ since the last update. The function $\tau(\cdot)$ is the variance of the true score as a function of time not played (e.g., $\Delta t$). The function $\tau(\Delta t)$ may be small for small times of $\Delta t$ to reflect that a participant's performance may not change over a small period of non-playing time. This function may increase as $\Delta t$ increases (e.g., more time to change behavior, etc). In the example below, the dynamic score function $\tau$ may return a constant value $\tau_0$, if the time passed since the last update is greater than zero as this indicates that at least one more interaction was played. If the time passed is zero, then the function $\tau$ may return 0. The constant function $\tau_0$ for the dynamic score function $\tau$ may be represented as:

$$\tau^2(\Delta t) = I_{\Delta t > 0} \tau_0^2 \quad (22)$$

where I is the indicator function.

Inference

The belief in a particular interaction outcome may be quantified with all knowledge obtained about the scores of each participant, $P(s)$. More particularly, the outcome of a potential interaction given the scores of selected participants may be determined. The belief in an outcome of a interaction for a selected set of participants may be represented as:

$$P(r|\{i_1, \ldots i_k\}) = \int P(r|s, \{i_1, \ldots i_k\}) P(s|\{i_1, \ldots i_k\}) ds \quad (23)$$
$$= \int P(r|S(s_{i_1}), \ldots, S(s_{i_k})\}) P(s) ds$$

where $S(s_{i_1}), \ldots, S(s_{i_k})$ is $s_A$ and $s_B$ for a two participant interaction. Such a belief in a future outcome may be used in matching participants for future interactions, as discussed further below.

Two Participant Example

With two participants (participant A and participant B) opposing one another in an interaction, the outcome of the interaction can be summarized in one variable y which is 1 if participant A wins, 0 if the participants tie, and −1 if participant A loses. If A is the reviewer and B is the reviewee then this corresponds to negative, neutral or positive feedback, respectively. In this manner, the variable y may be used to uniquely represent the ranks r of the participants. In light of equation (3) above, the update algorithm may be derived as a model of the interaction outcome y given the scores $s_1$ and $s_2$ as:

$$P(r|s_A, s_B) = P(y(r)|s_A, s_B) \quad (24)$$

where $y(r) = \text{sign}(r_B - r_A)$, where $r_A$ is 1 and $r_B$ is 2 if participant A wins, and $r_A$ is 2 and $r_B$ is 1 if participant B wins, and $r_A$ and $r_B$ are both 1 if participants A and B tie.

The outcome of the interaction (e.g., variable y) may be based on the latent scores of all participating participants (which in the two participant example are participants A and B). The latent score $x_i$ may follow a Gaussian distribution with a mean equivalent to the score $s_i$ of the participant with index i, and a fixed latent score variance $\beta^2$. More particularly, the latent score $x_i$ may be represented as $N(x_i, s_i, \beta^2)$.

The latent scores of the participants may be compared to determine the outcome of the interaction. However, if the difference between the teams is small, then the outcome of the interaction may be a tie. In this manner, a latent tie margin variable $\epsilon$ may be introduced as a fixed number to illustrate this small margin of equality between two competing participants. Thus, the outcome of the interaction may be represented as:

Participant A is the winner (negative feedback) if:

$$x_A > x_B + \epsilon \quad (25)$$

Participant B is the winner (positive feedback) if:

$$x_B > x_A + \epsilon \quad (26)$$

Participant A and B tie (neutral feedback) if:

$$|x_A - x_B| \leq \epsilon \quad (27)$$

Since the two latent score curves are independent (due to the independence of the latent scores for each participant), then the probability of an outcome y given the scores of the individual participants A and B, may be represented as:

$$P(y|s_A, s_B) \begin{cases} = P(\Delta < -\epsilon) & \text{if } y = -1 \quad (28) \\ = P(|\Delta| \leq \epsilon) & \text{if } y = 0 \quad (29) \\ = P(\Delta > \epsilon) & \text{if } y = +1 \quad (30) \end{cases}$$

where $\Delta$ is the difference between the latent scores $x_A$ and $x_B$ (e.g., $\Delta = x_A - x_B$).

As noted above, the scores (e.g., mean $\mu_i$ and variance $\sigma_i^2$) for each participant i (e.g., participants A and B), may be updated knowing the outcome of the interaction between those two participants (e.g., participants A and B). More particularly, using an ADF approximation, the update of the scores of the participants may follow a method now described. The static variable(s) may be initialized. For example, the latent tie zone $\epsilon$, the dynamic time update constant $\tau_0$, and/or the latent score variation $\beta$ may be initialized. Example initial values for these parameters may include: $\beta$ is within the range of approximately 100 to approximately 400 and in one example may be approximately equal to 250, $\tau_0$ is within the range of approximately 1 to approximately 10 and may be approximately equal to 10 in one example, and $\epsilon$ may depend on many factors such as the draw probability and in one example may be approximately equal to 50. The score $s_i$ (e.g., represented by the mean $\mu_i$ and variance $\sigma_i^2$) may be received for each of the participants i, which in the two participant example includes mean $\mu_A$ and variance $\sigma_A^2$ for participant A and mean $\mu_B$ and variance $\sigma_B^2$ for participant B.

Before a participant has had an interaction, the score represented by the mean and variance may be initialized to any suitable values. In a simple case, the means may be all initialized at the same value, for example $\mu_i = 1200$. Alternatively, the mean may be initialized to a percentage (such as 20-50%, and in some cases approximately 33%) of the average mean of the established participants. The variance may be initialized to indicate uncertainty about the initialized mean, for example $\sigma^2 = 400^2$. Alternatively, the initial mean and/or variance of a participant may be based in whole or in part on the score of that participant in another interaction environment.

If the belief is to be updated based on time, as described above, the variance of each participant's score may be updated based on the function $\tau$ and the time since the participant last played. The dynamic time update may be done in the reputation system. As noted above, the output of the dynamic score function $\tau$ may be a constant $\tau_0$ for all times greater than 0. In this manner, $\tau_0$ may be zero on the first time that a participant has an interaction, and may be the constant $\tau_0$ thereafter. The variance of each participant's score may be updated by:

$$\sigma_i^2 \leftarrow \sigma_i^2 + \tau_0^2 \quad (31)$$

To update the scores based on the interaction outcome, a parameter c may be computed 506 as the sum of the variances, such that parameter c is:

$$c = (n_A + n_B)\beta^2 + \sigma_A^2 + \sigma_B^2 \quad (32)$$
$$= 2\beta^2 + \sigma_A^2 + \sigma_B^2 \quad (33)$$

where $n_A$ is the number of participants in team A (in this example 1) and $n_B$ is the number of participants in team B (in this example 1).

The parameter h may be computed 506 based on the mean of each participant's score and the computed parameter c as:

$$h_A = \frac{\mu_A - \mu_B}{\sqrt{c}} \quad (34)$$

$$h_B = \frac{\mu_B - \mu_A}{\sqrt{c}} \quad (35)$$

which, indicates that $h_A = -h_B$. The parameter $\epsilon'$ may be computed 506 based on the number of participants, the latent tie zone $\epsilon$, and the parameter c as:

$$\epsilon' = \frac{\epsilon(n_A + n_B)}{2\sqrt{c}} \quad (36)$$

And for the two participant example, this leads to:

$$\epsilon' = \frac{\epsilon}{\sqrt{c}} \quad (37)$$

The outcome of the interaction between participants A and B may be received. For example, the interaction outcome may be represented as the variable y which is −1 if participant B wins, 0 if the participants tie, and +1 if participant A wins. To change the belief in the scores of the participants, the mean and variance of the each score may be updated. More particularly, if the participant A wins (e.g., y=1), then the mean $\mu_A$ of the winning participant A may be updated as:

$$\mu_A \leftarrow \mu_A + \frac{\sigma_A^2}{\sqrt{c}} v(h_A, \epsilon') \quad (38)$$

The mean $\mu_B$ of the losing participant B may be updated as:

$$\mu_B \leftarrow \mu_B + \frac{\sigma_B^2}{\sqrt{c}} v(h_A, \epsilon') \quad (39)$$

The variance $\sigma_i^2$ of each participant i (A and B) may be updated when participant A wins as:

$$\sigma_i^2 \leftarrow \sigma_i^2 \left(1 - \frac{\sigma_i^2}{c} w(h_A, \epsilon')\right) \quad (40)$$

However, if participant B wins (e.g., y=−1), then the mean $\mu_A$ of the losing participant A may be updated as:

$$\mu_A \leftarrow \mu_A - \frac{\sigma_A^2}{\sqrt{c}} v(h_B, \epsilon') \quad (41)$$

The mean $\mu_B$ of the winning participant B may be updated as:

$$\mu_B \leftarrow \mu_B + \frac{\sigma_B^2}{\sqrt{c}} v(h_B, \epsilon') \quad (42)$$

The variance $\sigma_i^2$ of each participant i (A and B) may be updated when participant B wins as:

$$\sigma_i^2 \leftarrow \sigma_i^2 \left(1 - \frac{\sigma_i^2}{c} w(h_B, \epsilon')\right) \quad (43)$$

If the participants A and B draw, then the mean $\mu_A$ of the participant A may be updated as:

$$\mu_A \leftarrow \mu_A + \frac{\sigma_A^2}{\sqrt{c}} \tilde{v}(h_A, \epsilon') \quad (44)$$

The mean $\mu_B$ of the participant B may be updated as:

$$\mu_B \leftarrow \mu_B + \frac{\sigma_B^2}{\sqrt{c}} \tilde{v}(h_B, \epsilon') \quad (45)$$

The variance $\sigma_A^2$ of participant A may be updated when the participants tie as:

$$\sigma_A^2 \leftarrow \sigma_A^2 \left(1 - \frac{\sigma_A^2}{c} \tilde{w}(h_A, \epsilon')\right) \quad (46)$$

The variance $\sigma_B^2$ of participant B may be updated when the participants tie as:

$$\sigma_B^2 \leftarrow \sigma_B^2 \left(1 - \frac{\sigma_B^2}{c} \tilde{w}(h_B, \epsilon')\right) \quad (47)$$

In equations (38-47) above, the functions $v()$, $w()$, $\tilde{v}()$, and $\tilde{w}()$ may be determined from the numerical approximation of a Gaussian. Specifically, functions $v()$, $w()$, $\tilde{v}()$, and $\tilde{w}()$ may be evaluated using equations (17-20) above using numerical methods such as those described in Press et al., Numerical Recipes in C: the Art of Scientific Computing (2d. ed.), Cambridge, Cambridge University Press, ISBN-0-521-43108-5, which is incorporated herein by reference, and by any other suitable numeric or analytic method.

The updated values of the mean and variance of each participant's score may replace the old values of the mean and variance. The newly updated mean and variance of each participant's score incorporate the additional knowledge gained from the outcome of the interaction between participants A and B.

The updated beliefs in a participant's score may be used to predict the outcome of an interaction between two potential opponents. For example, the reputation system 10 shown in FIG. 1 may use the updated and/or maintained scores of the participants to predict the outcome of an interaction between any potential participants and match those participants, e.g. by ensuring that with high probability they would give each other positive feedback. To predict the outcome of an interaction, the probability of a particular outcome y given the mean scores and standard deviations of the scores for each potential participant, e.g., $P(y|s_A, s_B)$ may be computed. Accordingly, the probability of the outcome (P(y)) may be determined from the probability of the outcome given the participant scores with the scores marginalized out.

Figure 5:
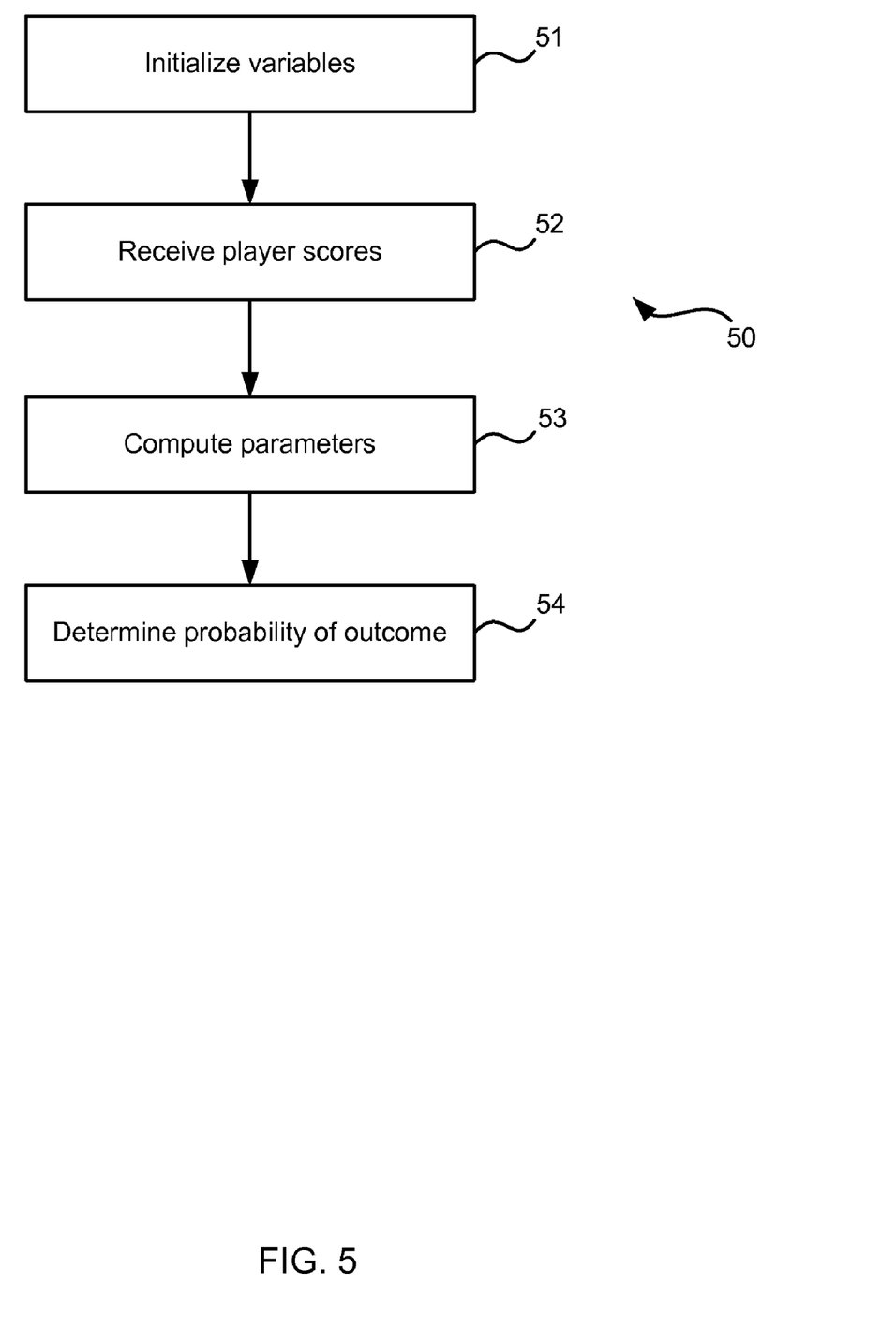
FIG. 5 is an example method of predicting an outcome of an interaction between participants in an activity.

FIG. 5 illustrates an example method 50 of predicting an interaction outcome between two potential participants (participant A and participant B). The static variable(s) may be initialized 51. For example, the latent tie zone $\epsilon$, the dynamic time update constant $\tau_0$, and/or the latent score variation $\beta$ may be initialized. The score $s_i$ (e.g., represented by the mean $\mu_i$ and variance $\sigma_i^2$) may be received 52 for each of the participants i who are participating in the predicted interaction. In the two participant example, the participant scores include mean $\mu_A$ and variance $\sigma_A^2$ for participant A, and mean $\mu_B$ and variance $\sigma_B^2$ for participant B.

Parameters may be determined 53. The parameter c may be computed 53 as the sum of the variances using equation (32) or (33) above as appropriate. Equations (32) and (33) for the parameter c may be modified to include the time varying aspects of the participant's scores, e.g., some time $\Delta t$ has passed since the last update of the scores. The modified parameter c may be computed as:

$$c = (n_A + n_B)\beta^2 + \sigma_A^2 + \sigma_B^2 + (n_A + n_B)\tau_0 \quad (48)$$

where $n_A$ is the number of participants in team A (in this example 1 participant) and $n_B$ is the number of participants in team B (in this example 1 participant). The parameter $\epsilon'$ may be computed using equation (36) or (37) above as appropriate.

The probability of each possible outcome of the interaction between the potential participants may be determined 54. The probability of participant A winning may be computed using:

$$P(\gamma = 1) = \Phi\left(\frac{\mu_A - \mu_B - \epsilon'}{\sqrt{c}}\right) \quad (49)$$

The probability of participant B winning may be computed using:

$$P(\gamma = -1) = \Phi\left(\frac{\mu_B - \mu_A - \epsilon'}{\sqrt{c}}\right) \quad (50)$$

As noted above, the function $\Phi$ indicates a cumulative Gaussian distribution function having an argument of the value in the parentheses and a mean of zero and a standard deviation of one. The probability of participants A and B having a draw may be computed using:

$$P(y=0) = 1 - P(y=1) - P(y=-1) \quad (51)$$

The determined probabilities of the outcomes may be used to match potential participants for an interaction, such as comparing the probability of either team winning or drawing with a predetermined or user provided threshold or other preference. In the context of a reputation system it may be desirable to match participants so as to minimize the probability of negative feedback or to maximize the probability of positive feedback.

Exemplary Computing-Based Device

Figure 6:
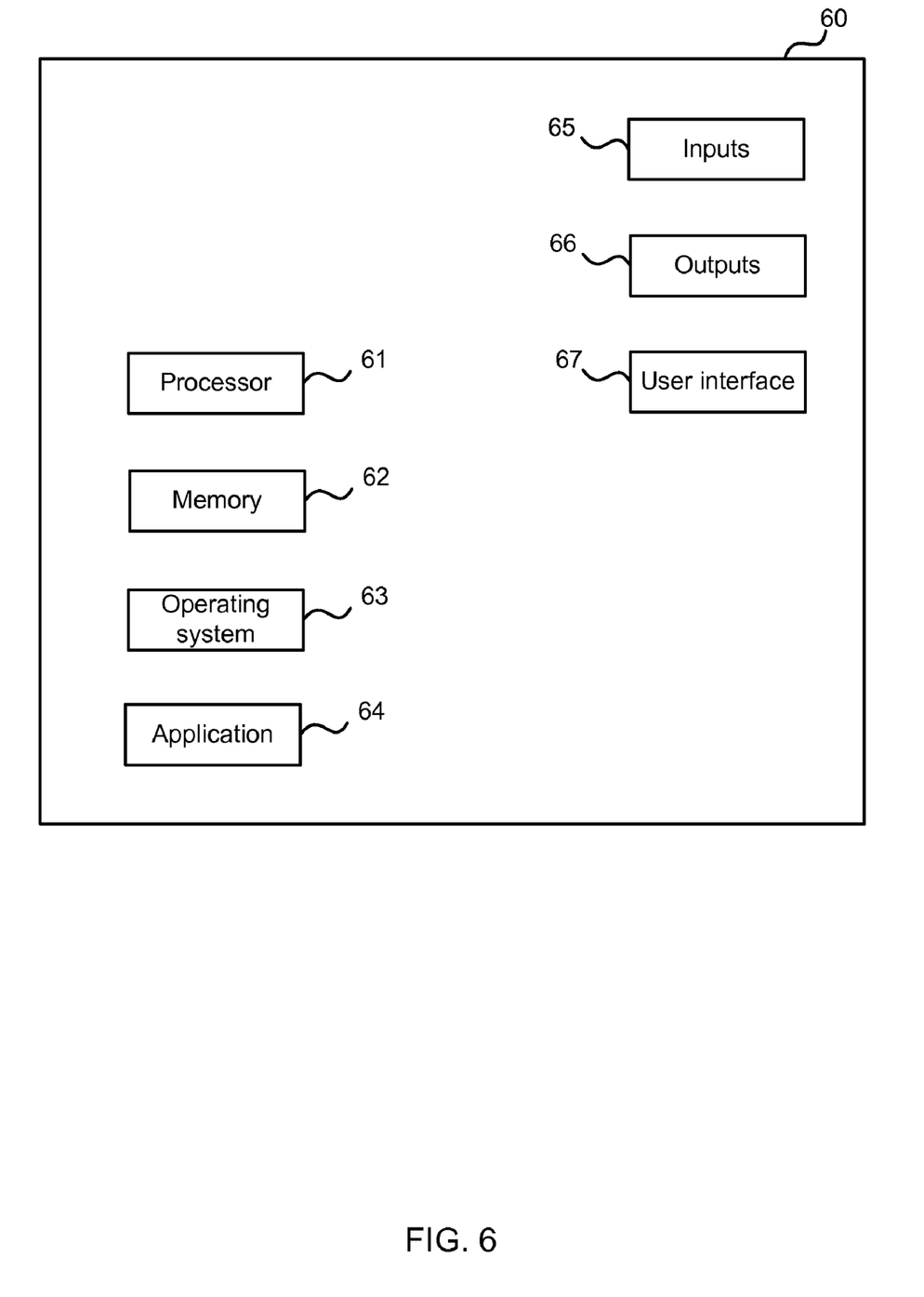
FIG. 6 illustrates an exemplary computing-based device in which embodiments of a reputation system may be implemented.

FIG. 6 illustrates various components of an exemplary computing-based device 60 which may be implemented as any form of a computing and/or electronic device, and in which embodiments of a reputation system may be implemented.

The computing-based device 60 comprises one or more inputs 65 which are of any suitable type for receiving information about interactions between participants of an activity and/or information about participants. The inputs are arranged to receive inputs from a database storing reputation information about participants in the case that such a database is not integral with the reputation system itself. The inputs may also be suitable for receiving information about the activity itself and optionally also about any communications medium used by participants in order to take part in the activity.

Computing-based device 60 also comprises one or more processors 61 which may be microprocessors, controllers or any other suitable type of processors for processing computing executable instructions to control the operation of the device in order to provide a reputation system. Platform software comprising an operating system 63 or any other suitable platform software may be provided at the computing-based device to enable application software 64 to be executed on the device in order to provide functionality of the reputation system.

The computer executable instructions may be provided using any computer-readable media, such as memory 62. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

One or more outputs 66 are provided to output information from the reputation system such as information about reputations of participants and/or required reputations of participants. These outputs may be of any suitable type. A user interface 67 is optionally provided incorporating a display, printer, or other output means, to enable an end user to access information from the reputation system such as information about reputations and required reputations. The user interface may optionally be arranged to enable an operator to configure parameters used in the reputation system and to control the reputation system. use block rather than step or box when describing flow diagrams The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
for each participant in an activity, modeling, by one or more processors, a reputation of the participant relating to the activity and modeling, by the one or more processors, a required reputation of the participant relating to a reference value based on a reporting threshold determined by actions of the participant as a reviewer of other participants' behavior in the activity;
receiving, by the one or more processors, information about an interaction between participants in the activity, the information comprising positive, negative, or neutral feedback given by a first participant about a second participant's behavior in the interaction;
accessing, by the one or more processors, information stored in memory about the first participant's required reputation and about the second participant's reputation; and
updating, by the one or more processors, the accessed information on the basis of the received information and storing the updated information in memory, wherein updating the accessed information is carried out using an update rule which comprises a relationship between the first participant's required reputation and the second participant's reputation, wherein the update rule comprises a partial update process when the received information is neutral feedback, and wherein the partial update process comprises:
updating the accessed information with pre-specified feedback comprising positive feedback or negative feedback prior to storing the updated information in memory, and
interpolating a standard deviation value between a standard deviation of the stored information and a standard deviation of the updated information and replacing the standard deviation of the stored information with the interpolated standard deviation value, and interpolating a mean value between a mean value of the stored information and a mean value of the updated information and replacing the mean value of the stored information with the interpolated mean value.

2. The computer-implemented method as claimed in claim 1 wherein modeling the reputation and the required reputation comprises using a probability distribution.

3. The computer-implemented method as claimed in claim 2 wherein accessing the stored information comprises accessing a mean and a standard deviation value of a belief distribution associated with the first participant's required reputation or with the second participant's reputation.

4. The computer-implemented method as claimed in claim 1 wherein updating the accessed information comprises using a Bayesian statistical update mechanism.

5. The computer-implemented method as claimed in claim 1 which further comprises, accessing information about required reputation and reputation for two participants proposed for a potential interaction together in the activity, and using the accessed information to predict an outcome of that proposed interaction.

6. A computer-implemented method comprising:
for each of at least two participants in an activity, modeling, by one or more processors, a reputation of the participant relating to the activity and modeling, by the one or more processors, a required reputation of the participant, relating to a reference value based on a reporting threshold determined by actions of the participant as a reviewer of other participants' behavior in the activity;
receiving, by the one or more processors, information about an interaction between participants in the activity, the information comprising positive, negative, or neutral feedback given by a first participant about a second participant's behavior in the interaction;
accessing, by the one or more processors, information stored in memory about the first participant's required reputation and about the second participant's reputation; and
updating, by the one or more processors, the accessed information on the basis of the received information and storing the updated information in memory, wherein accessing the stored information comprises accessing one or more statistics relating to a belief distribution associated with the first participant's required reputation and accessing one or more statistics relating to a belief distribution associated with the second participant's reputation, wherein updating the accessed information is carried out using an update rule which comprises a relationship between the first participant's required reputation and the second participant's reputation, wherein the update rule comprises a partial update process when the received information is neutral feedback, and wherein the partial update process comprises:

updating the accessed information with pre-specified feedback comprising positive feedback or negative feedback prior to storing the updated information in memory, and interpolating a standard deviation value between a standard deviation being one of the one or more statistics of the stored information and a standard deviation of the updated information and replacing the standard deviation of the stored information with the interpolated standard deviation value, and interpolating a mean value between a mean value being one of the one or more statistics of the stored information and a mean value of the updated information and replacing the mean value of the stored information with the interpolated mean value.

7. The computer-implemented method as claimed in claim 6 wherein modeling the reputation and the required reputation comprises using a probability distribution.

8. The computer-implemented method as claimed in claim 6 wherein updating the accessed information comprises using a Bayesian statistical update mechanism.

9. One or more computer-readable storage media, the one or more computer-readable storage media being hardware, storing computer-readable instructions that, when executed on a processor, configure the processor to perform acts comprising:

modeling, for each participant in an activity, a reputation of the participant relating to the activity and modeling a required reputation of the participant, relating to a reference value based on a reporting threshold determined by actions of the participant as a reviewer of other participants' behavior in the activity;

receiving information about an interaction between a first and a second participant in the activity, the information comprising positive, negative, or neutral feedback given by the first participant about the second participant's behavior in the interaction;

accessing information stored in memory about the first participant's required reputation and about the second participant's reputation;

updating the accessed information on the basis of the received information and storing the updated information in memory, wherein updating the accessed information is carried out using an update rule which comprises a relationship between the first participant's required reputation and the second participant's reputation, wherein the update rule comprises a partial update process when the received information is neutral feedback, and wherein the partial update process comprises:

updating the accessed information with pre-specified feedback comprising positive feedback or negative feedback prior to storing the updated information in memory, interpolating a standard deviation value between a standard deviation of the stored information and a standard deviation of the updated information and replacing the standard deviation of the stored information with the interpolated standard deviation value, and interpolating a mean value between a mean value of the stored information and a mean value of the updated information and replacing the mean value of the stored information with the interpolated mean value.

10. The one or more computer-readable storage media as claimed in claim 9, wherein updating the accessed information comprises using a Bayesian statistical update mechanism.

* * * * *